United States Patent [19]

Witt et al.

[11] 4,337,958
[45] Jul. 6, 1982

[54] SUSPENSION AND STABILIZING SYSTEM FOR A SNOWMOBILE

[75] Inventors: Jerry A. Witt, Solon Springs, Wis.; Izumi Takagi, Akashi, Japan

[73] Assignee: Kawasaki Motors Corp. U.S.A., Santa Ana, Calif.

[21] Appl. No.: 167,695

[22] Filed: Jul. 11, 1980

[51] Int. Cl.³ .......................................... B62M 27/02
[52] U.S. Cl. .................................... 280/16; 180/190; 280/723
[58] Field of Search .................. 280/21 R, 21 A, 16, 280/27, 25, 723, 695; 180/190; 267/57, 22 R, 25, 151

[56] References Cited

U.S. PATENT DOCUMENTS

| | | | |
|---|---|---|---|
| 2,220,916 | 11/1940 | Schiff | 280/695 |
| 2,563,261 | 8/1951 | Montrose-Oster | 267/22 R |
| 3,402,940 | 9/1968 | Castelet | 280/723 |
| 3,650,341 | 3/1972 | Asmussen | 280/21 R |
| 3,674,103 | 7/1972 | Kiekhaefer | 280/21 R |
| 3,750,774 | 8/1973 | Trapp | 280/723 |
| 3,835,947 | 9/1974 | Alexandor | 280/21 R |
| 3,931,862 | 1/1976 | Cote | 180/190 |
| 3,977,485 | 8/1976 | West et al. | 280/21 R |
| 4,172,591 | 10/1979 | Craig | 280/723 |

*Primary Examiner*—David M. Mitchell
*Attorney, Agent, or Firm*—Poms, Smith, Lande & Rose

[57] ABSTRACT

A front suspension and stabilizing system for a snowmobile in which a pair of front steerable skis are connected to the vehicle body through a pair of suspension means which also are connected to a transversely extending torsion member attached to the vehicle body. The response of the torsion member to movement of the suspension means is stabilized and dampened by a resilient yieldable means such as a shock absorber connected to a mid portion of the torsion member through a forwardly extending arm fixed to the torsion member and connected at its other end to the shock absorber. A stabilizing system for a suspension system having a steering strut subject to axial and rotational movement, the steering strut being connected to a torsion member through a forwardly disposed link having universal connections to the strut and to the torsion member. The longitudinal axis of the link lies in a vertical plane which passes through the axis of the steerable strut and the longitudinal axis of the ski for transmitting vertical movement of the ski and associated steering strut to the torsion member during travel in a straight direction as well as during turning of the vehicle.

5 Claims, 5 Drawing Figures

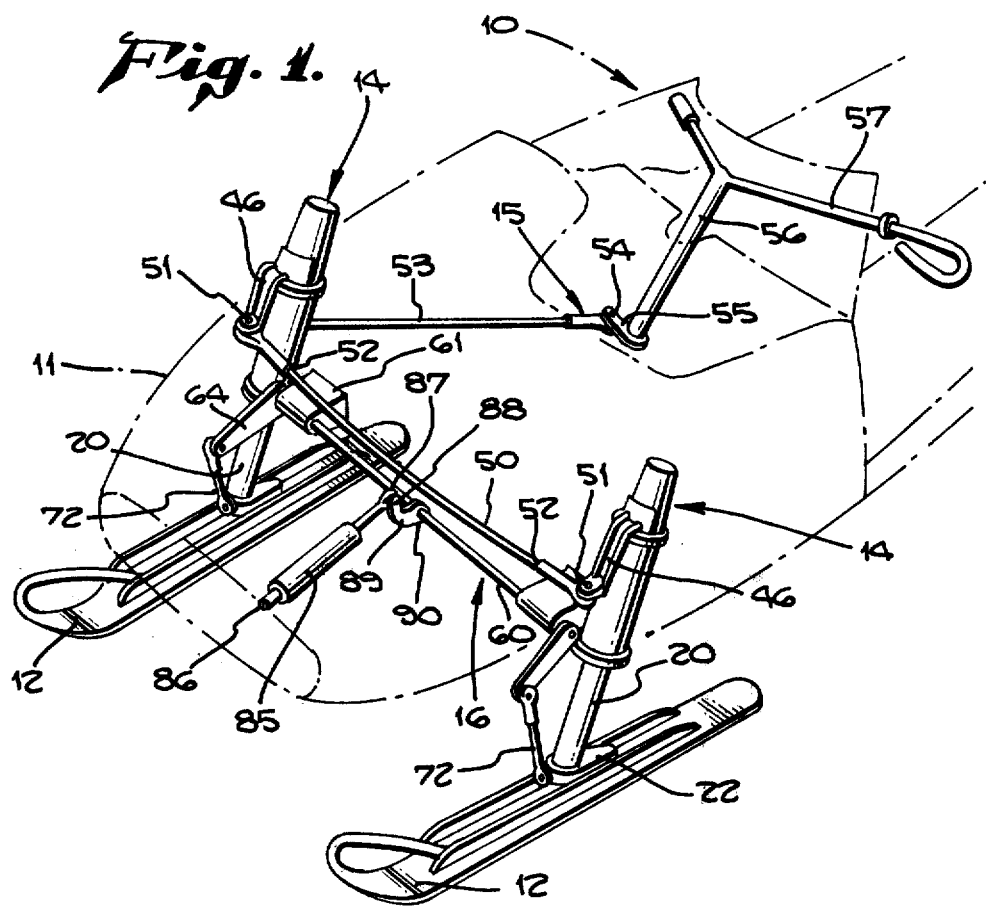
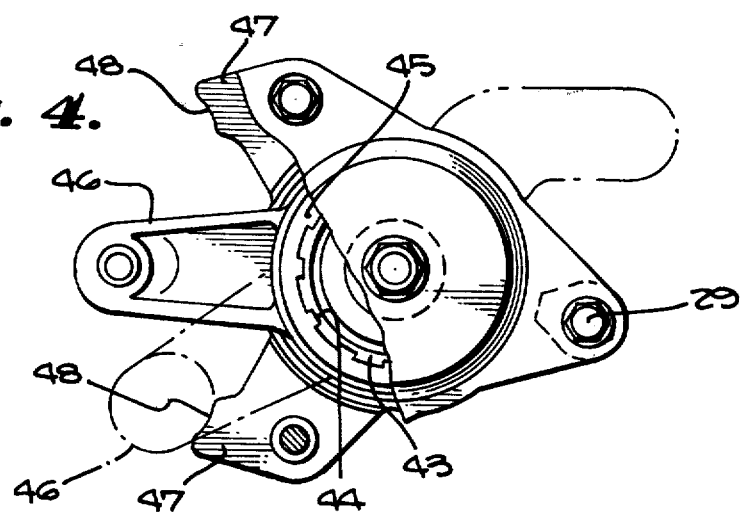

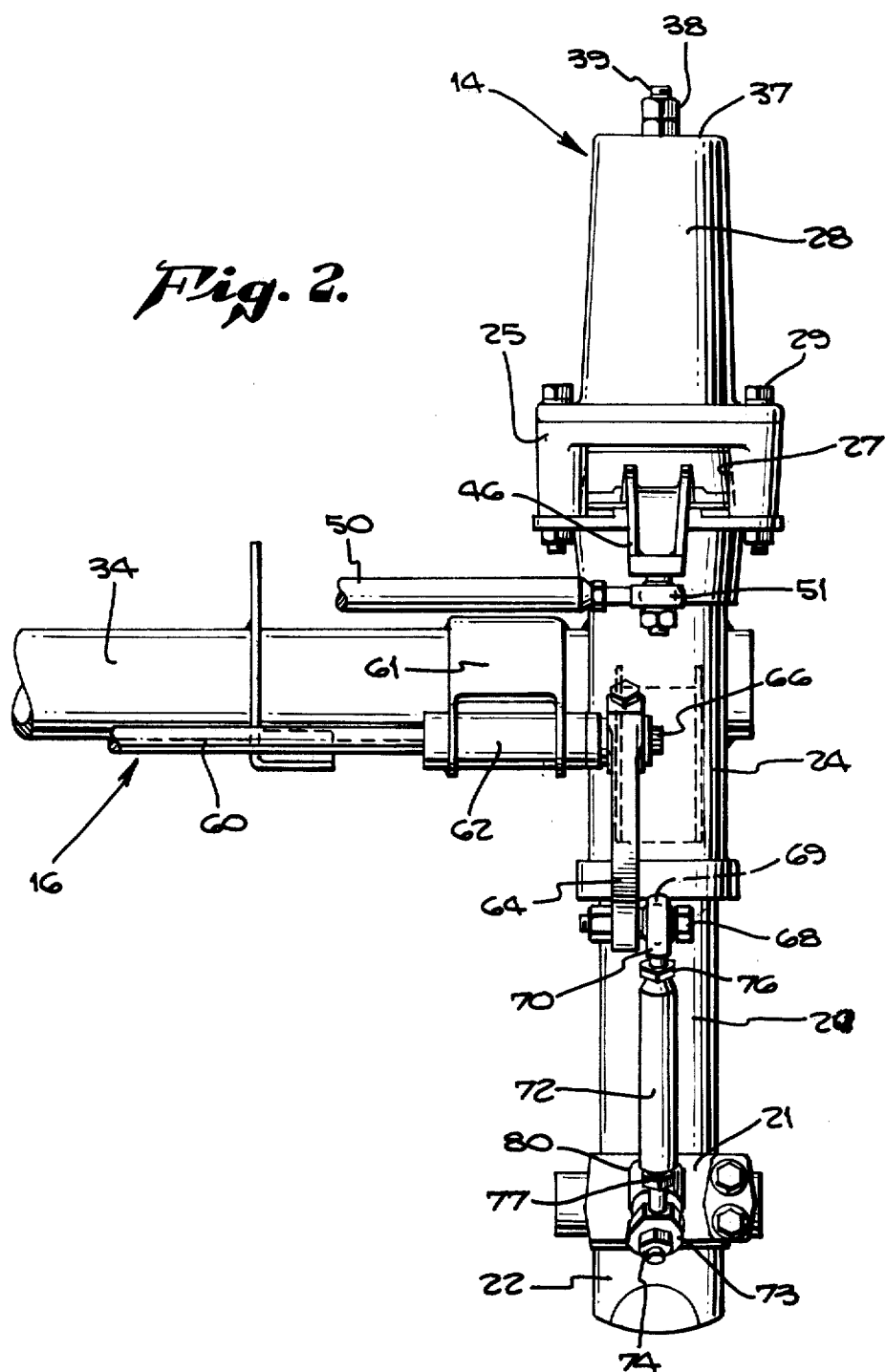

SUSPENSION AND STABILIZING SYSTEM FOR A SNOWMOBILE

BACKGROUND OF THE INVENTION

This invention relates to snowmobiles of the type having a vehicle body driven by suitable endless track means, the front end of the snowmobile being supported upon a pair of transversely spaced steerable skis each connected to the body by suspension means.

Prior proposed suspension and stabilizing systems for such a pair of front skis for a snowmobile have included the use of leaf springs connected with each ski and a shock absorber associated in various ways with the leaf spring as mentioned in U.S. Pat. No. 3,977,485. Stabilization of such leaf spring suspensions further included the employment of torsion bars as shown in U.S. Pat. Nos. 3,674,103 and 3,835,947. In U.S. Pat. No. 3,674,103 the ends of the torsion bar were loosely connected to the pair of front skis by permitting laterally outwardly extending ends of the torsion bar to move in longitudinal openings provided by straps secured to the top of each ski. In U.S. Pat. No. 3,835,947 the inturned end portions of the torsion bar were connected to the ski by outwardly curved links having their outer ends pivotally connected to the ski for movement about a vertical axis. It has also been known to stabilize the front of a snowmobile by a torsion bar having a lever at each end, and linkage pivotally interconnecting each lever with a nonrotatable and vertically movable housing which supports a strut connected to the ski.

In another prior proposed suspension and steering assembly for a ski of a snowmobile, telescoping strut members connect the ski to the snowmobile, the two strut members being nonrotatably connected and one of the strut members being rotatable about its longitudinal axis to steer the ski, U.S. Pat. No. 3,931,862.

Another proposed strut type suspension system shown in U.S. Pat. No. 3,977,485 provided that the strut member connected to the ski should be rotatably mounted and connected with the steering mechanism. This patent also shows a control or stabilizing arm pivotally connected to the rotatable strut at one end and connected to a structural portion of the snowmobile frame or body at the other end.

Such prior proposed suspension and stabilizing systems for snowmobiles represented improvements in steering and riding characteristics of snowmobiles. The strut type suspension and steering system as shown in U.S. Pat. No. 3,977,485 provides substantially independent action of each suspension means and under some conditions may permit excessive rolling of the vehicle when cornering. Further, a severe shock load on one strut during high speed straight running may adversely affect the control and riding characteristics of the snowmobile.

SUMMARY OF THE INVENTION

The present invention relates to a suspension and stabilizing system for a snowmobile in which each of the two front skis are connected to the vehicle body through a strut type suspension system in which one of the struts is connected to the ski and is telescopically movable within the other strut. The movable strut is connected with the steering mechanism and serves as a steering strut which is subject to both movement along its axis and limited rotational movement for steering.

The invention contemplates stabilization of such a front steering suspension system by a novel arrangement for connecting the movable steering strut to a transverse torsion means and also a novel arrangement for dampening movement of the suspension system such as by a torsion means having a lever or swing arm connected to one end of a resilient yieldable means such as a shock absorber or spring attached to the vehicle for resisting motion of the ski toward the vehicle.

The primary object of the present invention is to provide a novel front suspension and stabilizing system for a snowmobile wherein a torsion member is provided with a universal connection to a steering part of the suspension system.

An object of the present invention is to provide a stabilizing system for the suspension system of a snowmobile wherein response of a torsion member to such suspension system is dampened by a shock absorber connected to the torsion member.

Another object of the present invention is to provide a stabilizing means for a suspension system for a vehicle utilizing a torsion means connected to the suspension means and arranged to be responsive to vertical movement of terrain engaging means on the vehicle while permitting rotational movement of a steering street of the suspension system.

A general object of the present invention is to provide a stabilizing system providing antiroll characteristics to a snowmobile vehicle to provide good cornering while at the same time reducing or minimizing shock loads on the suspension systems in high speed straight running of the vehicle.

A specific object of the invention is to provide a suspension system adapted to connect a vehicle with a ground engaging means such as a ski, torsion means carried by the vehicle and cooperatively connected to the suspension means, and means carried by the vehicle and connected to the torsion means for dampening response of the torsion means to operation of the suspension system. The invention further contemplates a stabilizing means for a vehicle suspension system in which a movable elongated strut in the suspension system is used for steering and is provided with axial and rotational movement, a transverse torsion member carried by the vehicle, and means connecting the torsion member to the movable strut for dampening axial movement of the strut while permitting rotational movement of the strut.

A specific object of the invention is to provide means for dampening response of a torsion member to vertical movement of a steerable ski to which it is connected by a torque arm and universally connected link means.

A still further object of the invention is to provide a stabilizing means utilizing a torsion member in which the torsion member is connected with a stearable strut of a suspension means on the vehicle in a novel manner and in which the response of the torsion member is subject to dampering means.

Various other objects and advantages of the present invention will be readily apparent from the following description of the drawings in which an exemplary embodiment of the invention is shown.

IN THE DRAWINGS

FIG. 1 is a perspective view of a pair of front skis, suspension system therefor, and steering mechanism for a snowmobile vehicle embodying this invention, the vehicle body being shown in phantom lines.

FIG. 2 is a fragmentary front view of the suspension system of the stabilizing system for one of the skis shown in FIG. 1.

FIG. 4 is a fragmentary top view of FIG. 2, a portion of the suspension means being broken away to show the steering connection with a steering strut of the suspension system.

DETAILED DESCRIPTION

Figure 5:
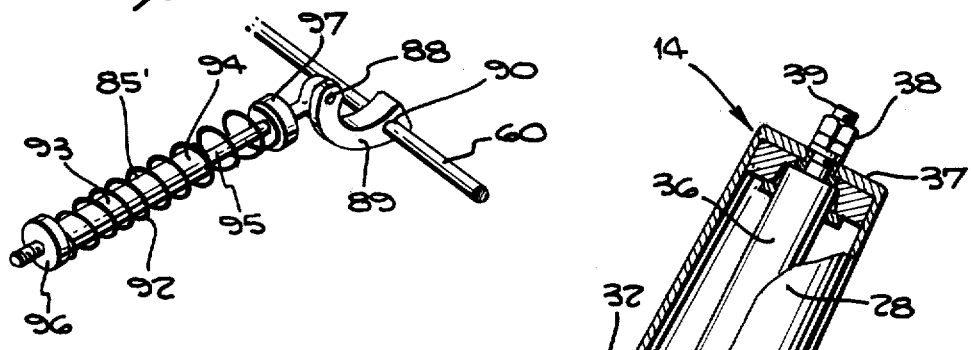
FIG. 5 is a fragmentary enlarged view of a shock absorber dampening means forming part of the stabilizing system for the snowmobile vehicle.

A snowmobile vehicle generally indicated at 10 in FIG. 1 may include a vehicle body and supporting frame 11 in phantom lines propelled in well-known manner by endless track means (not shown) for driving engagement with the terrain. Such snowmobiles may include a pair of front steerable skis 12 of suitable construction. Skis 12 are connected to vehicle body 11 by a pair of suspension means 14 connectd with a steering means 15 and with a stabilizing means 16. The novel arrangement of the suspension means, and stabilizing means forms the subject matter of this invention. The terrain engaging skis 12 are subject to vertical and limited pivotal movement relative to the body as the skis move over the terrain and are also subject to turning movement by steering means 15 in order to direct the snowmobile along a selected path of travel.

A suspension means 14 is best viewed in FIGS. 2 and 3; each of the interconnected suspension means 14 is substantially identical and only one will be described. Each suspension means 14 includes a first hollow steerable strut member 20 having its lower end received in a connector fitting 21 having a limited pivotal connection to a base 22 adapted to be suitably secured to ski 12. Connector fitting 21 is constructed and arranged so that the longitudinal axis of steerable strut member 20 lies at an upwardly and rearwardly inclined angle approximately 25° to the vertical, as for example. Strut member 20 is telescopically received within a coaxially aligned second composite strut member 24 which extends within an enlarged steering housing 25 welded to strut member 24 as at 26. Steering housing 25 is provided with an arcuate transversely arranged window 27 through which a steering arm 46 of steering mechanism 15 may extend as later described. Steering housing 25 carries a removable second strut hollow head member 28 secured thereto as by spaced nut and bolt assemblies 29. Second strut member 24 is provided with suitable seal means at 31 for sliding engagement with the exterior surface of first steering strut member 20 and with a suitable housing bearing 32 for relative turning or rotative motion between steering strut member 20 and the second strut member 24. Second strut member 24 may be secured as by welding at 33 to a transversely extending tubular frame member 34 for securing the second strut member 24 to the frame of the vehicle body.

Within the hollow first and second strut members 20 and 24 may be mounted a cartridge type shock absorber means 36 having its top end secured in suitable manner to end wall 37 of the head member 28 by suitable nuts 38 threadedly engaging shaft 39 of the upper end of shock absorber 36. The lower end of shock absorber 36 includes a telescopically related rod 41 secured in suitable manner (not shown) to the lower end of steering strut 20. Shock absorber 36 may be of any suitable well-known construction and may include internal or external coil springs in association with the fluid dampening mechanism of the shock absorber. It will be understood that the cartridge type shock absorber 36 may be readily replaced by removing head 28 and disengaging the connections of shock absorber 36 with head 28 and with the steering strut 20.

Figure 3:
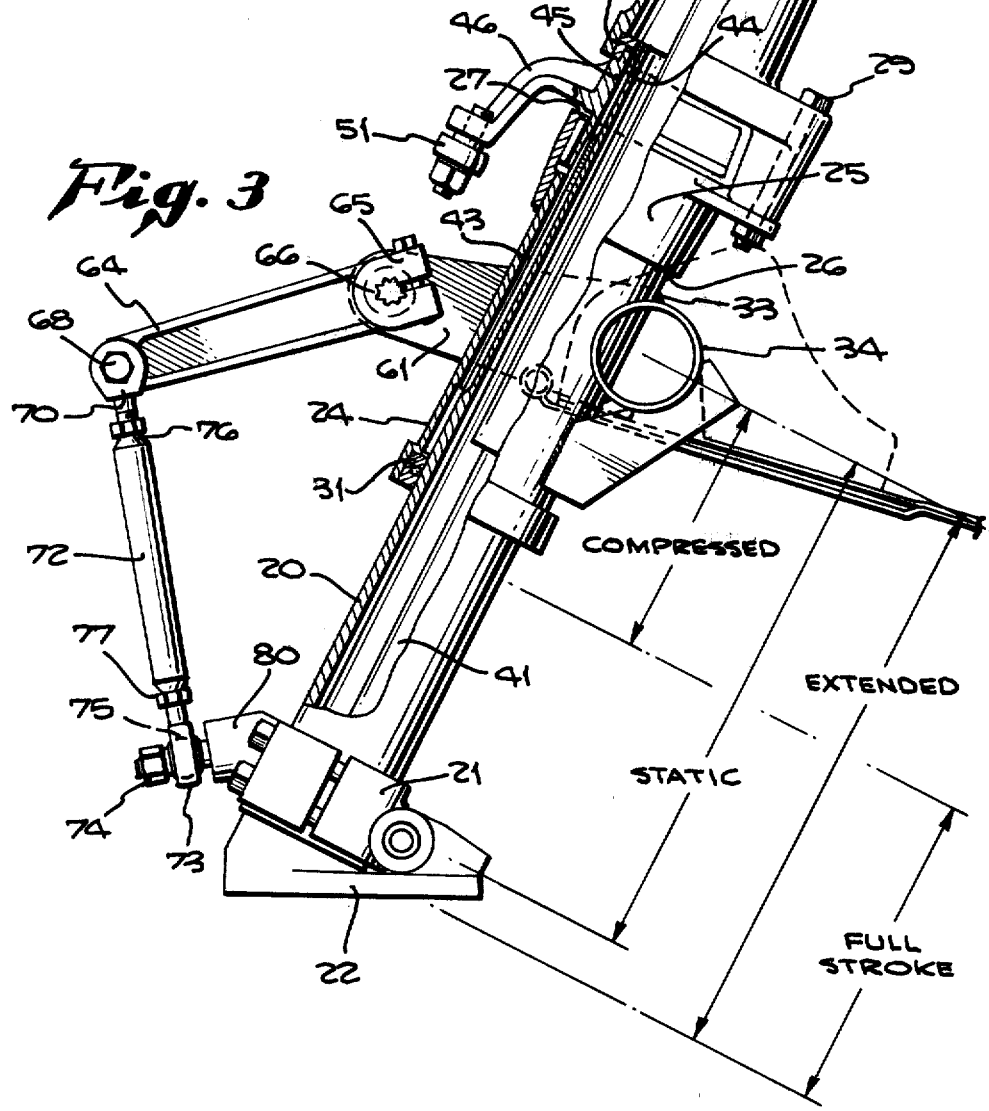
FIG. 3 is a side elevational view partly in section, of the suspension system shown in FIG. 2, the ski not being shown.

As shown in FIG. 3, strut 20 is reciprocally movable relative to strut 24 and may be provided with longitudinally extending splines 43, FIGS. 3 and 4, which interengage with longitudinal splines 44 provided on an arcuate portion 45 of a steering arm 46 which extends through window 27 and which is permitted limited arcuate movement, for example, approximately 60° about the axis of suspension means 14. The steering housing 25 may be provided with spaced radially extending forwardly directed portions 47 having arcuate stop faces 48 to limit turning movement of steering arm 46. When steering strut 20 and strut 24 are relatively moved between extended and collapsed positions, the splines 44 permit sliding relative movement of splines 45 during the full stroke of the suspension means to maintain steerability of the skis and associated steering strut 20 and strut 24.

The steering means 15 may comprise, in addition to the steering arms 46 a tie bar 50 having opposite ends pivotally interconnected at 51 to ends of arms 46, the length of such tie bar 50 being readily adjusted in well-known manner by threaded connections at 52. The right (as viewed from the driver) steering arm 46 and tie bar end 50 are suitably connected to an extension steering bar 53 pivotally connected at 54 to steering post arm 55 carried by steering post 56 to which is attached suitable steering handle bars 57. The handle bars 57, when turned to steer the snowmobile, will cause corresponding turning of the steering struts 20 of the suspension means 14 and the associated skis 12.

Stabilizing means 16 includes a transversely extending torsion member 60 of suitable metal material carried by forwardly extending spaced brackets 61 secured to frame member 34 as by welding. Torsion member 60 is mounted in each bracket 61 in an elongated bearing sleeve 62 to permit rotation of member 60 or relative twisting of torsion member 60 about its axis between its ends. Each end of torsion member 60 projects beyond the adjacent mounting bracket 61 and fixedly adjustably carries a forwardly and downwardly extending torque arm 64 of suitable length and slightly inwardly of the axis of suspension means 14. Rearmost end 65 of arm 64 may be provided with a split end with serrated or tooth-like internal surface configurations for interengagement with complementary serrations on the end of torque member 60 as at 66 for fixedly adjusting the angle of torque arm 64 in static position of the suspension means.

Each torque arm 64 carries at its opposite end a universal type pivotal connection comprising in this example, a bolt and nut assembly 68 having a part-spherical universal bearing portion 69 thereon outboardly of arm 64 for cooperation with an annular end fitting 70 having part-spherical internal surfaces for cooperable engagement with the bearing portion 69 on the bolt to permit relative universal motion between fitting 70 and bolt assembly 68. Fitting 70 is carried at one end of link member 72 which is provided with a similar universal fitting 73 at its other end for engagement with a bolt assembly 74 provided with a part-spherical pivotal bearing portion 75 received within the fitting 73 for universal movement between fitting 73 and the bolt assembly 74. Both fittings 70 and 73 are adjustably connected at 76 and 77 to the link member 72 so that the effective operative length of link member 72 may be readily adjusted. Bolt assembly 74 is carried by a forwardly extending portion 80 of strut fitting 21, the axis of the bolt assembly being inclined downwardly at an angle of approximately 40° to a transverse plane normal to the axis of the suspension means and steering strut member 20. Link member 72 has its longitudinal axis lying in the same vertical plane as the longitudinal axis of the steering strut 20 and longitudinal axis of the associated ski.

It will thus be apparent that during reciprocal relative movement of steering strut member 20 in the suspension means 14 that such relative generally vertically movement of the strut 20 will be transmitted through link 72 to torque arm 64.

During steering of the snowmobile by turning of the steering strut member 20, such rotation of member 20 about its axis will be permitted through the universal pivotal connections at 70 and 73 of the link 72 and without transfer of such motion to the torsion member. Thus combined vertical and turning movement of strut member 20 will be permitted while only the vertical movement of the strut member will be transmitted to the torsion member 60.

It should also be noted that lateral load force components acting on the ski in travel over uneven terrain or during turning will be principally taken by suspension means 14. The arrangement of the link 72 with its axis in the vertical plane of the axis of suspension means 14 and also ski 22 in normal position together with the universal pivotal connections of link 72 with the steering strut 20 and with the torsion arm 64 substantially reduces or eliminates the transmission of such lateral force components to torque arm 64 and the torsion means 16. Such positioning of the link 72 in relation to the torque arm 64 and the steering strut member 22 affords a unique arrangement for a suspension system for a snowmobile.

Stabilizing means 16 includes in addition to torque member 60 a resilient yieldable means 85 which may be connected at one end 86 to the vehicle frame in suitable manner (not shown). At its other end 87 the resilient yieldable means 85 is pivotally connected at 88 to one end of an angle shaped crank or swing arm 89 having a fixed connection at 90 to a central or intermediate portion of torque member 60. In the example of a resilient yieldable means 85 shown in FIG. 1, such means 85 may comprise a suitable shock absorber having internal fluid dampening means constructed in well known manner. Such shock absorber means may also be provided with internal spring means (not shown).

In FIG. 5 another example of a resilient yieldable dampening means is shown such as an external coiled spring 92 of suitable compression characteristics. Coil spring 92 may be sleeved over a telescopic guide means 93 comprising a cylinder 94 and a rod 95. One end of cylinder 94 may carry a longitudinally adjustable annular disc 96 providing an annular seat for one end of spring 92. Rod 95 may be provided with an annular disc 97 providing an annular seat for the other end of spring 92. Rod 95 may have its end pivotally connected to arm 89 at 88 as in the prior embodiment of the torsion member dampening means.

In operation of the stabilizing means 16 particularly including the resilient yieldable means 85 and 85', when the snowmobile is traveling along a straight path that relative movement between the strut members 20 and 24 of the suspension means 14 will be transmitted to the torsion member 60 through link 72 and arm 64 to cause rotative movement of torsion member 60 about its longitudinal axis. Such turning causes arcuate movement of arm 89. Such arcuate movement is resisted by resilient yieldable means 85 or 85' and such rotative response of the torsion member 60 is dampened by the means 85 or 85' which results in dampening movement of the steering strut 20.

When the snowmobile vehicle is traveling over irregular terrain it will be apparent that strut members 20 of each suspension means 14 may respond to the irregular terrain in different degrees and in different relative movement of the strut members 20 along their axes with respect to the strut members 24. Such differential movement of strut members 20 is transmitted to the torque member 60 and may cause twisting of the torsion member 60 about its longitudinal axis. Any such twisting of the torsion member is resisted by the resilient yieldable means 85 or 85' through movement of arm 89. A dampening effect on the twisting of the torsion member 60 occurs and such dampening effect results in stabilization of the response of the two suspension means 14 to such irregular terrain.

In a turning or cornering situation, as described above, the rotation of the strut members 20 about their axes during turning is not transmitted to the torsion member 60 because of the universal pivotal connection of link 72 to the torque arm 64 and to the steering strut member 20. However vertical movement of strut members 20 either of uniform displacement or differential displacement will be transmitted to the torsion member and such vertical movement will be dampened by the resilient yieldable means 85 connected to the torsion member 60. Operation of the suspension steering and stabilizing system of this invention as described above includes the effective dampening by the torsion member and its shock absorber means 85 or 85' of a shock load acting upon only one of the struts 20 of a suspension means 14.

In the above description the suspension means 14 has been described as including an internal shock absorber means 36 if desired and a conventional telescopic strut with a shock absorber may be employed. However the resilient yieldable means 85 or 85' may include shock absorber characteristics of sufficient dampening quality that the suspension assemblies 14 may be provided with shock absorbers of relatively light duty or depending upon the vehicle loads such a shock absorber within the suspension means 14 may be omitted, thereby placing the dampening and stabilizing functions entirely on the torsion member 60 and the resilient yieldable means 85 or 85'.

Depending upon clearance conditions and other body configurations of the front end of the snowmobile, it may be desirable that the ends of the torsion member 60 be extended beyond the plane defined by the axes of the suspension means and the link member so that the torque arm 64 is located outboardly thereof.

The invention contemplates not only the use of a centrally located resilient means 85 or 85' connected to the torsion member 60 but also the use of two or more means 85 connected to the member 60 in spaced relation. Further, while the orientation of the means 85 is generally horizontal, depending upon vehicle body space requirements the orientation may be other than horizontal, such as vertical.

It will be readily apparent that various modifications and changes may be made in the suspension steering and stabilizing system described hereinabove that come within the spirit of this invention and all such changes and modifications coming within the scope of the appended claims are in place thereby.

What is claimed is:

1. In a suspension and stabilizing system for a snowmobile vehicle having a pair of steerable skis and a steering means therefor, the combination of:
   a suspension means for each steerable ski including a steering strut member connected to the ski and reciprocally movable in a generally vertical direction;
   each of said strut members being connected to said steering means for turning of said strut members and the associated skis;
   and a stabilizing means interconnecting each steering strut member for dampening movement of said strut members;
   said stabilizing means including a torsion member carried by said vehicle and pivotally connected to each of the steering strut members and responsive to vertical movement of the skis,
   a link means universally pivotally connecting each of the steering strut members with the torsion member,
   said link means including a link member lying in the planar zone defined by the axes of the steering strut member and associated ski.

2. In a system as stated in claim 1 wherein
   each of said link members is positioned forwardly of said steering strut and includes a universal pivotal connection to said torsion member and to said steering strut member.

3. In a stabilizing means for a vehicle suspension system, said vehicle including a terrain engaging means, the combination of:
   a movable elongated strut in said suspension system provided with axial and rotational movement relative to said vehicle;
   a transverse torsion member carried by the vehicle;
   and means connecting the torsion member to the movable strut for response of the torsion member in torque to axial movement of the strut while permitting rotational movement of the strut;
   said connecting means including an arm extending from said torsion member parallel to a plane defined by the axis of said strut and the terrain engaging means,
   and link means pivotally connected to one end of said arm and to said strut, said link means lying in said plane.

4. In a suspension system for a vehicle including a terrain engaging means and a strut means, the combination of:
   an elongated steerable strut member having an axis and attached to said terrain engaging means and movable axially and rotationally about said axis relative to a strut member attached to said vehicle;
   and a stabilizing means comprising
   a torsion member supported from said vehicle in transverse relation thereto,
   and a link means interconnecting one end of said torsion member with said steerable strut member and lying in a planar zone defined by the terrain engaging means and said steerable strut member.

5. A suspension system for a vehicle as stated in claim 4 including strut means on opposite sides of said vehicle,
   ends of said torsion member interconnecting said strut means,
   and a dampening means connected to said torsion member intermediate its ends,
   said dampening means being responsive to differential displacement of the terrain engaging means associated with the strut means on opposite sides of the vehicle.

* * * * *